United States Patent
Mitsuhashi

[11] Patent Number: 6,151,125
[45] Date of Patent: Nov. 21, 2000

[54] METHOD AND APPARATUS FOR MEASURING SURFACE REFLECTANCE OF LIGHT-TRANSMITTING TYPE ANTIREFLECTION OPTICAL FUNCTION FILM AND METHOD OF PRODUCING THE FILM

[75] Inventor: Shinobu Mitsuhashi, Kanagawa, Japan

[73] Assignee: Sony Corporation, Tokyo, Japan

[21] Appl. No.: 09/320,279

[22] Filed: Jun. 2, 1999

[30] Foreign Application Priority Data

Jun. 5, 1998 [JP] Japan .................................. 10-158069

[51] Int. Cl.[7] .................................................. G01N 21/55
[52] U.S. Cl. ............................................................ 356/445
[58] Field of Search ................................. 356/445, 447, 356/448

[56] References Cited

U.S. PATENT DOCUMENTS

| | | | |
|---|---|---|---|
| 4,831,276 | 5/1989 | Hyakumura | 356/445 |
| 5,444,329 | 8/1995 | Matsuda et al. | 313/479 |
| 5,587,835 | 12/1996 | Shimizu et al. | 359/589 |

*Primary Examiner*—Richard A. Rosenberger
*Attorney, Agent, or Firm*—Ronald P. Kananen; Rader, Fishman & Grauer

[57] ABSTRACT

A method and apparatus for measuring a surface reflectance of an antireflection optical function film for use on a CRT display panel etc. accurately and in real time by the following formula:

$$RI_s = RI - (TI)^2 \times [RI_b/(1-RI_b)^2]$$

where, $RI_s$ is the surface reflectance of the light-transmitting type antireflection optical function film, $RI$ is the actually measurable total reflectance, $TI$ is the actually measurable transmittance, and $RI_b$ is the back reflectance calculated by a regression formula.

15 Claims, 11 Drawing Sheets

METHOD AND APPARATUS FOR MEASURING SURFACE REFLECTANCE OF LIGHT-TRANSMITTING TYPE ANTIREFLECTION OPTICAL FUNCTION FILM AND METHOD OF PRODUCING THE FILM

BACKGROUND OF THE INVENTION

1. Field of the Invention

The present invention relates to a method and apparatus for measuring a surface reflectance (reflectivity) of a light-transmitting type antireflection optical function film and a method of producing a light-transmitting type antireflection optical function film by using the method of measuring the surface reflectance.

2. Description of the Related Art

Various display devices suffer from the disadvantage of a difficulty in viewing the content of the display due to reflection of light from the area around the display device, for example, light from fluorescent lights installed at the ceilings of offices or sunlight entering from windows.

Many attempts have been made to deal with this disadvantage. One approach has been to improve the method of lighting in the offices such as through the use of indirect lighting. Another approach has been to apply antireflection measures to the display devices themselves. The latter approach is necessary in cases where there is little incentive for making special improvements in the lighting system, for example, for television sets and other display devices installed in the general home. Of course, the same antireflection measures are effective for display devices used in offices as well, for example, computer displays.

As such display devices requiring antireflection measures, for example, cathode ray tube (CRT) displays, liquid crystal displays (LCD), plasma displays, electroluminescence (EL) displays, and RE displays. Below, the explanation will be given using a CRT display as a representative case.

Displayed information visible through the CRT display panel of the CRT display sometimes becomes difficult to see due to reflection of light from around the CRT display. Various antireflection measures against outside light have been devised for CRT display panels.

One of these antireflection measures against outside light is the provision of a light-transmitting type antireflection optical function film (hereinafter called just an "optical function film") on the surface of a CRT display panel.

The inventors previously proposed a "low reflection film and display panel using a low reflection film" in Japanese Patent Application No. 10-6999 filed on Jan. 16, 1998, in which they disclosed an example of an antireflection multilayer film which forms a surface of an optical function film suitable for such a purpose.

From the viewpoint of quality control of an optical function film and improvement of the efficiency of the production process, it is desirable to be able to accurately measure the surface reflectance of the optical function film in real time in the process of production of the optical function film and reflect (feed back) the results to the production process.

Measurement of only the surface reflectance of an optical function film per se has been difficult up to now, however, due to the effect of reflection from the back of the optical function film.

Therefore, up until now, the surface reflectance of an optical function film has been measured in a state of no reflection from the back of the optical function film by covering the back of a sample of the optical function film cut out from the process of production of the optical function film with for example a black paint absorbing the light.

Such a method of measurement, however, is a kind of destructive test of the optical function film since it is necessary to obtain samples of all of the optical function films for which the surface reflectance must be measured from the production process. Further, since the back of an optical function film for which the surface reflectance is to be measured must be painted black each time, time and trouble are taken. Further, this method of measurement of the surface reflectance involved manual work and therefore could not be applied to a process for continuous production of an optical function film where it is necessary to measure the surface reflectance of the optical function film in real time and notify the production line of the optical function film in advance and improve the production conditions when defective optical function film starts to be produced.

A method has been known for estimating the surface reflectance of an actual optical function film in a process of production of an optical function film by subtracting from the total reflectance measured in real time a reflectance correction value.

Further, a method has been proposed to calculate the surface reflectance of an optical function film from the actually measured total reflectance using a conversion formula.

Summarizing the disadvantage to be solved by the invention, with the above measurement methods, sometimes the surface reflectance obtained by the correction or calculation in the production process of the optical function film differed from the surface reflectance measured when painting black the back of a piece of the optical function film obtained by an actual sampling inspection, i.e., it was not possible to accurately measure the surface reflectance of the optical function film.

Further, in a sampling inspection of the optical function film etc., it was necessary to paint the back of a sample of the optical function film black to prevent reflection from the back of the optical function film. Also, that portion of the optical function film used for measurement of the surface reflectance was broken and could no longer be used.

Still further, with a sampling inspection, not all of the optical function film is inspected, so it was not possible to detect defects in parts of the optical function film. Accordingly, it is desirable to be able to accurately measure the surface reflectance of all of the optical function film continuously and in real time.

In addition, with the methods of the related art, since it was not possible to reflect (feed back) accurate measurements of the surface reflectance of the optical function film to the production process of the optical function film in real time, the disadvantage was encounted that the yield of the optical function film produced was low.

The above disadvantages will be discussed in further detail later with reference to the drawings.

While the above discussion was given with reference to measurement of the surface reflectance of an optical function film provided on a CRT display panel as the display panel, it is not limited to CRT display panels—similar disadvantages are encountered in optical function films provided on liquid crystal displays, plasma display, electroluminescence displays, RE displays, etc.

SUMMARY OF THE INVENTION

An object of the present invention is to provide a method and apparatus for measuring the surface reflectance of a light-transmitting type antireflection optical function film used for various display devices non-destructively and accurately.

Another object of the present invention is to provide a method and apparatus for measuring the surface reflectance of a light-transmitting type antireflection optical function film used for various display devices accurately and in real time in a process for production of the optical function film.

Still another object of the present invention is to provide a method and apparatus for measuring the surface reflectance of a light-transmitting type antireflection optical function film used for various display devices in a simple manner.

Yet another object of the present invention is to provide a method of producing a light-transmitting type antireflection optical function film improving the yield of the optical function film produced.

The inventors studied the error in measurement of the reflectance of a light-transmitting type antireflection optical function film and found that it was caused by the ratio of a back reflection component with respect to the total reflectance including the back reflection component varying in accordance with the transmittance and surface reflectance. For example, when the surface reflectance of the optical function film desired to be measured becomes small, the amount of light entering from the surface of the optical function film and reaching the back of the optical function film increases, the amount of a back reflection light reflected from the back and reaching the surface increases, and the ratio of the back reflection component to the total reflectance increases. Consequently, with the methods of correcting and calculating the reflectance by constants of the related art, it was not possible to find the surface reflectance accurately. The same was true for the method using a conversion formula. Details of the above will be given later with reference to the drawings.

Further, the inventors found that the back reflectance of the optical function film found by the method of the present invention is affected by the superposition of interference waves due to a hard coat layer of an optical function film and that it is possible to eliminate the effect of the interference waves accurately by a regression operation using a polynomials between wavelengths of light entering the optical function film and back reflectance at those wavelengths.

The present invention was made based on the above discoveries.

According to a first aspect of the present invention there is provided a method of measuring a surface reflectance of a light-transmitting type antireflection optical function film including a step of calculating the surface reflectance of the optical function film from a back reflectance, total reflectance, and transmittance of the optical function film.

The surface reflectance of the optical function film is preferably defined by the following formula:

$$RI_s = RI - (TI)^2 \times [RI_b/(1-RI_b)^2]$$

where, $RI_s$ is the surface reflectance of the optical function film, $RI$ is the total reflectance of the optical function film, $TI$ is the transmittance of the optical function film, and $RI_b$ is the back reflectance of the optical function film.

Preferably, the method further comprises steps of calculating the back reflectance of a representative film in advance; measuring the actual total reflectance and transmittance of the optical function film being measured in real time; and entering the back reflectance and the total reflectance and transmittance calculated for the optical function film to be measured into the above formula to calculate the surface reflectance.

Further, preferably, the back reflectance $RI_b$ is calculated from a surface reflectance $RI_s$, total reflectance $RI$, and transmittance measured by sampling in advance for a representative film by entering these measured values into the formula for finding the measured surface reflectance $RI_s$ and by performing a regression operation using polynomials between the back reflectance $RI_b$ for each wavelength found here and a wavelength of the light entering the optical function film for smoothing.

The above calculation will be explained further here. The back reflectance $RI_b$ for each wavelength can be calculated by the following formula from the surface reflectance $RI_s$, total reflectance $RI$, and transmittance $TI$ for each wavelength measured for samples in advance:

$$RI_b = (\tfrac{1}{2}k) \times [2k+1-((2k+1)^2-4k^2)^{1/2}]$$

The above formula is obtained by solving the following formula used for finding the surface reflectance $RI_s$ using the back reflectance $RI_b$.

$$RI_s = RI - TI^2[RI_b/(1-RI_b)^2]$$

Further, preferably, the total reflectance $RI$ is calculated by detecting the light reflected from the surface and back of the optical function film when an incident light $\phi_i$ having a predetermined wavelength enters the optical function film to detect the total reflected light $\phi_R$ and performing the operation $RI = \phi_R/\phi_i$.

Further, preferably, the transmittance $TI$ is calculated by detecting the light $\phi_t$ transmitted through the optical function film when the incident light $\phi_i$ having a predetermined wavelength enters the optical function film in a perpendicular direction and performing the calculation $TI = \phi_t/\phi_i$.

Preferably, the transmittance is found in advance by sampling for the representative film and that value is used for calculating the surface reflectance.

Preferably, the optical function film comprises a stacked antireflection multilayer film, bonding layer, hard coat, and polyethylene terephthlate (PET) film having similar refractive indices.

According to a second aspect of the present invention, there is provided a method of producing a light-transmitting type antireflection optical function film including the steps of: sampling a representative film for a film continuously produced from an apparatus for continuously producing the optical function film and measuring in advance a back reflectance for the sampled film; measuring in real time a transmittance and total reflectance of the continuously produced film being measured; calculating in real time a surface reflectance of the optical function film using the transmittance and total reflectance and the previously calculated back reflectance; and feeding back the calculated surface reflectance to the production in the process of production of the optical function film to thereby produce a film having a desired surface reflectance.

Preferably, the surface reflectance of the optical function film is defined by the above formula.

According to a third aspect of the present invention, there is provided an apparatus for measuring in real time a surface reflectance of a light-transmitting type antireflection optical function film being continuously produced from an apparatus for continuously producing the optical function film, comprising a total reflectance calculation apparatus including a first light source means for emitting a first light having a first wavelength to the optical function film at a predetermined angle, a first light receiving means for detecting the light reflected from the surface and back of the optical function film, and a total reflectance calculating means for calculating a ratio of the first light and the detected reflected light to calculate the total reflectance; a transmittance calculation apparatus including a second light source means for emitting a second light having a second wavelength to the optical function film at a right angle, a second light receiving means for detecting the light passed through the optical function film, and a transmittance calculating means for calculating a ratio of the second light and the detected passing light to calculate the transmittance; a back reflectance calculating means for calculating in advance a back reflectance of a representative film; and a surface reflectance calculating means for calculating for an optical function film being measured the surface reflectance of the optical function film from the total reflectance calculated at the total reflectance calculation apparatus, the transmittance calculated at the transmittance calculation apparatus, and the back reflectance calculated at the back reflectance calculating means.

Preferably, the surface reflectance calculating means computes the surface reflectance of the optical function film based on the above formula.

Preferably, the total reflectance calculating means in the total reflectance calculation apparatus, the transmittance calculating means in the transmittance calculation apparatus, and the surface reflectance calculating means are formed by a single processing means.

In the present invention, it is not possible to measure just the surface reflectance $RI_s$ of the optical function film. The surface reflectance $RI_s$ of the optical function film is found by calculation, assuming detection of reflected light of a combination of the surface reflectance $RI_s$ and the back reflectance $RI_b$ and assuming that the back reflectance $RI_b$ cannot be directly measured, according to the above formula from the measurable total reflectance RI (sum of surface reflectance $RI_s$ and back reflectance $RI_b$), the measurable transmittance TI, and the not directly measurable back reflectance $RI_b$ found by calculation from the surface reflectance, total reflectance, and transmittance measured in advance for a sample taken in advance and smoothed by a regression operation using polynomials.

BRIEF DESCRIPTION OF THE DRAWINGS

The above and other objects and features of the present invention will be become clearer by the following description given with reference to the accompanying drawings, in which.

DESCRIPTION OF THE PREFERRED EMBODIMENTS

A method and apparatus for measuring the surface reflectance of a light-transmitting type antireflection optical function film and a method of producing the optical function film by using the method of measuring the surface reflectance according to preferred embodiments of the present invention will be explained below.

A light-transmitting type antireflection optical function film (hereinafter called an "optical function film") will be described first. Note that the embodiments of the present invention will be explained with reference to a CRT display device as the display device and thus a CRT display panel will be explained as a display panel on which the optical function film is provided.

Figure 1:
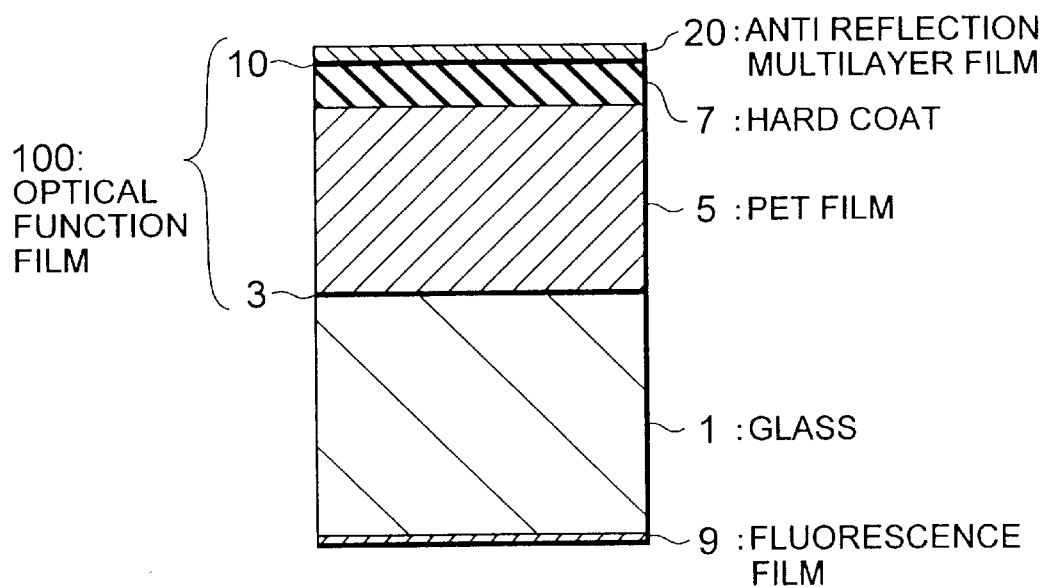
FIG. 1 is a sectional view of an optical function film, comprised of a stacked antireflection multilayer film, a bonding layer, a hard coat, and a PET film, provided on a CRT display panel of a CRT display.

FIG. 1 is a sectional view of the configuration of an optical function film provided on a CRT display panel of a CRT display device.

An optical function film 100 is adhered to an outer surface of a CRT display panel (glass panel) 1 of a CRT display device by an adhesive layer 3.

The optical function film 100 is comprised of a stacked antireflection multilayer film 20, a bonding layer 10, a hard coat 7, and a PET film 5. The bonding layer 10 is provided to improve the bond between the antireflection multilayer film 20 and hard coat 7. The assembly of the antireflection multilayer film 20, bonding layer 10, hard coat 7, and PET film 5 is referred to as the "light-transmitting type antireflection optical function film" ("optical function film").

A fluorescence film 9 is formed on an inner surface of the CRT display panel 1 facing the optical function film 100 and is scanned by electron beams.

The thickness of the CRT display panel 1 is, for example, 15 mm. The thickness of the optical function film comprised of the stacked antireflection multilayer film 20, bonding layer 10, hard coat 7, and PET film 5 is, for example, 0.2 mm.

The PET film 5 in the optical function film 100 functions as a base film for the antireflection multilayer film 20.

The hard coat 7 in the optical function film 100 is provided between the antireflection multilayer film 20 and the PET film 5 to improve the durability of the PET film 5.

The bonding layer 10 in the optical function film 100 is provided between the hard coat 7 and the antireflection multilayer film 20 to improve the bonding of the antireflection multilayer film 20 to the hard coat 7.

The antireflection multilayer film 20 in the optical function film 100 will be described in detail with reference to FIG. 2.

The antireflection multilayer film 20 forming part of the optical function film 100 may be the antireflection multilayer film proposed in the specification of Japanese Patent Application No. 10-6999.

Figure 2:
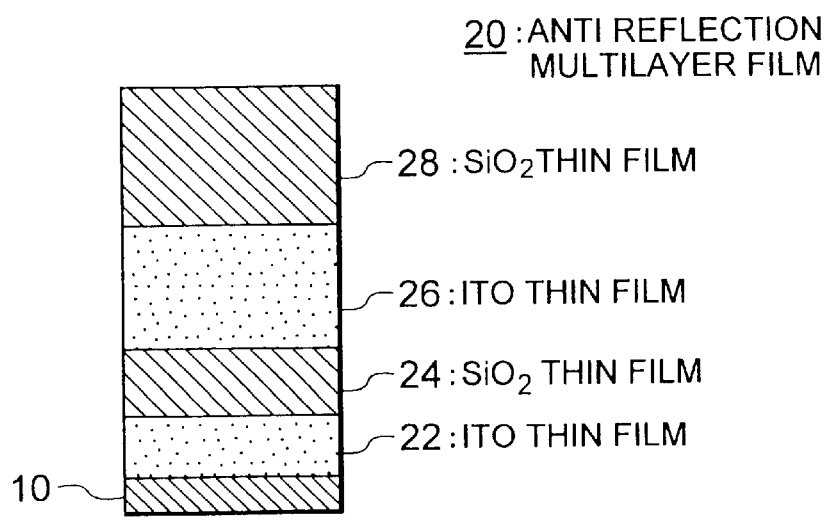
FIG. 2 is a sectional view of the antireflection multilayer film formed at the surface of the optical function film shown in FIG. 1.

An example of such an antireflection multilayer film 20 is illustrated in FIG. 2. FIG. 2 is a sectional view of the antireflection multilayer film described in Japanese Patent Application No. 10-6999 for the "Low Reflection Film and DISPLAY Panel Using a Low Reflection Film".

The antireflection multilayer film 20 illustrated in FIG. 2 is adhered to the hard coat 7 through the bonding layer 10.

The antireflection multilayer film 20 is structured by stacking a first transparent (ITO) thin film 22, a first silicon dioxide thin film 24, a second ITO thin film 26, and a second silicon dioxide thin film 28. The antireflection multilayer film 20 is a low reflection film for reducing the reflection of light and is formed to give not more than a predetermined reflectance by adjusting the thicknesses of the films forming the low reflection film.

The thicknesses of the films of the antireflection multilayer film 20 may be adjusted to give a spectral reflectance of not more than 1% when light having a wavelength of 490 nm to 640 nm strikes the low reflection film at an angle of 10°.

The thicknesses of the films of the antireflection multilayer film 20 may also be adjusted to display spectral reflectance characteristics of the long wavelength side, for example, to give a spectral reflectance of not more than 1% when light having a wavelength of 650 nm strikes the low reflection film at an angle of 10°, a spectral reflectance of not more than 1.6% when light having a wavelength of 700 nm strikes it, and a spectral reflectance of not more than 2.7% when light having a wavelength of 750 nm strikes it.

Further, the thicknesses of the films of the antireflection multilayer film 20 may be further adjusted to give a y-value of chromaticity of the reflected light of 0.10 to 0.25 when light having a wavelength of 380 nm to 780 nm strikes the antireflection multilayer film 20 at an angle of 10°.

The relationship between the thicknesses of the films and the light is described in detail in Japanese Patent Application NO. 10-6999.

The thicknesses of the films in the antireflection multilayer film 20 are controlled in the process of production of the optical function film with the antireflection multilayer film 20 formed at its surface so as to given the above spectral reflectance characteristics.

In this embodiment of the present invention, the total thickness of the antireflection multilayer film 20 is approximately 0.2 $\mu$m.

Figure 3A:
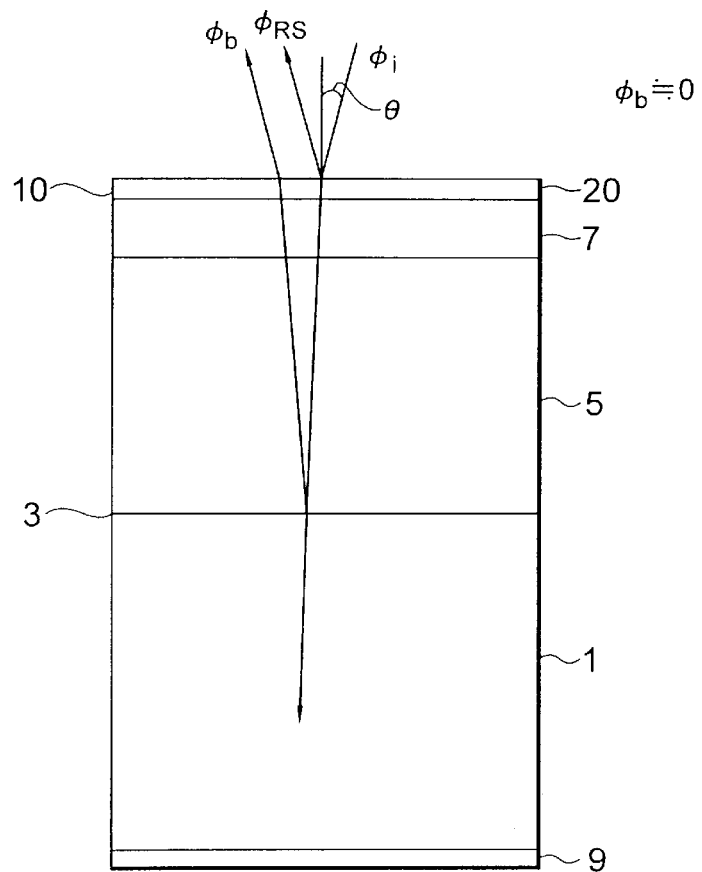
FIG. 3A is a view of how light striking the surface of the CRT display panel on which the optical function film shown in FIG. 1 is provided is reflected at the surface of the optical function film and how light entering into the optical function film is refracted and how it passes through it.

FIG. 3A is a view of how incident light $\phi_i$ striking the surface of the optical function film provided on the CRT display panel 1 shown in FIG. 1 is reflected at the different layers of the optical function film, is refracted at the optical function film, and passes through the optical function film.

Figure 3B:
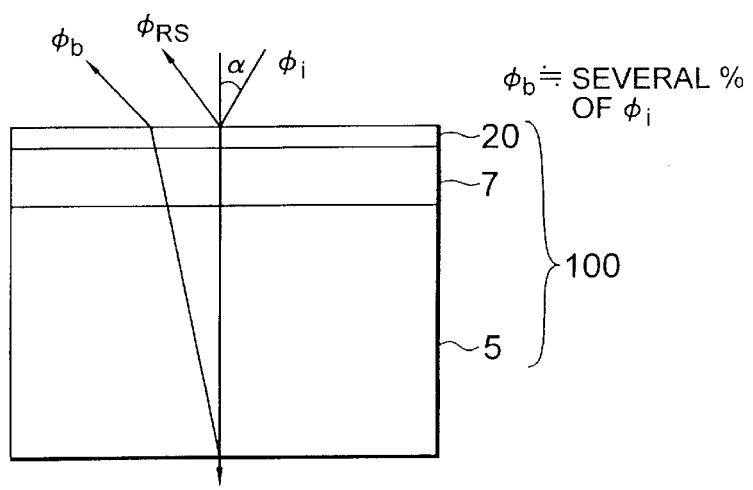
FIG. 3B is a view of how light striking the surface of the optical function film is directly reflected at the surface of the optical function film and how the light entering into the optical function film is refracted and how it passes through the optical function film.

FIG. 3B is a view of how incident light $\phi_i$ striking the surface of the optical function film in the state with the optical function film not provided on the surface of the CRT display panel 1 as in FIG. 3A is reflected at the different layers of the optical function film, is refracted, and passes through the optical function film As the optical function films shown in FIGS. 3A and 3B, use is made of the one illustrated in FIG. 1.

In FIGS. 3A and 3B, incident light $\phi_i$ striking the surface of the antireflection multilayer film 20, positioned at the outermost surface of the optical function film provided on the CRT display panel 1, at an incident angle $\theta$ is partially reflected at the surface of the antireflection multilayer film 20. This reflected light is called the "surface reflected light $\phi_{RS}$" in this specification.

The light which is not reflected at the surface of the antireflection multilayer film 20 passes through the Inside of the antireflection multilayer film 20, passes through the hard coat 7, and then passes through the PET film 9. In FIG. 3B, the light passing through the PET film 5 is mostly output from the back of the optical function film, but in FIG. 3A, the light passing through the PET film 5 further enters the CRT display panel 1.

In FIG. 3B, part of the light passing through the antireflection multilayer film 20 is reflected back toward the surface of the antireflection multilayer film 20 due to the difference between the refractive indices of the antireflection multilayer film 20 and the hard coat 7. Part of the light passing through the hard coat 7 is reflected back from the interface (boundary) of the hard coat 7 and the PET film 5 through the hard coat 7 toward the surface of the antireflection multilayer film 20 due to the difference between refractive indices of the hard coat 7 and the PET film 5. Part of the light about to be output from the PET film 5 to the outside is reflected back at the interface due to the difference in refractive indices between the PET film 5 and the outside air and passes through the PET film 5 and hard coat 7 toward the surface of the antireflection multilayer film 20.

The sum of the light reflected back at the interfaces of the different layers forming the optical function film is called the "back-reflected light $\phi_b$" in this specification. Note that approximately 80 to 90% of the incident light $\phi_i$ passes through the PET film 5 to the outside air and approximately 10% returns to the surface as the back-reflected light $\phi_b$.

In FIG. 3A, the path of the light from the antireflection multilayer film 20 to the PET film 5 is similar to that shown in FIG. 3B.

Light is reflected at the interface of the PET film 5 and the CRT display panel 1 as well due to the difference of refractive indices. The reflected light passes through the PET film 5 and the hard coat 7 toward the surface of the antireflection multilayer film 20. In this case too, the sum of the light reflected at the interfaces is called the "back-reflected light $\phi_b$". Note that by suitably selecting the refractive indices of the PET film 5 and the hard coat 7, the back-reflected light $\phi_b$ when adhering an optical function film comprised of a stacked antireflection multilayer film 20, hard coat 7, and PET film 5 on a CRT display panel 1 can be reduced to a negligible value.

In FIGS. 3A and 3B, the refractive indices of the PET film 5 serving as the base film for the antireflection multilayer film 20, the bonding layer 10, and the CRT display panel 1 are close, so in practice the reflections at the interfaces are very small. Accordingly, the reflections from the PET film 5 etc. at the inside of the antireflection multilayer film 20 can be de facto ignored.

As shown in FIG. 1, when the optical function film 100 is adhered to the surface of a CRT display panel 1, the light passing from the optical function film 100 toward the CRT display panel 1 enters through the adhesive layer 3 to the inside of the CRT display panel 1. Most of the light entering the CRT display panel 1 is absorbed at the glass CRT display panel 1 and the fluorescence film 9 formed at the inner surface of the CRT display panel 1.

In this way, the reflectance of the optical function film 100 should be evaluated by the actual reflectance when the optical function film 100 is adhered to the surface of the CRT display panel 1. The reflectance at this time is defined as being equivalent to the surface reflectance of the optical function film 100.

The reflectance of the optical function film 100 is normally measured by using a spectrophotometer. An example of the method of measurement is described with reference to FIG. 4.

Figure 4:
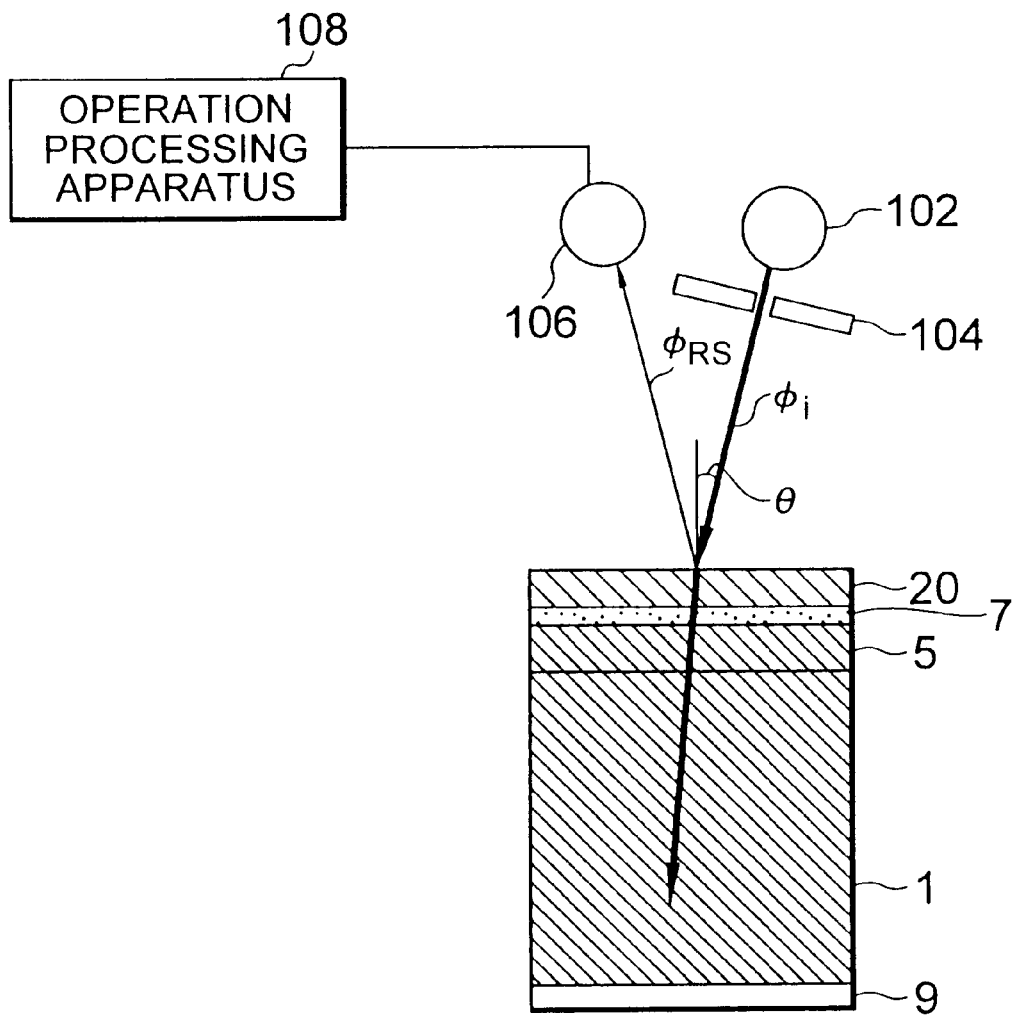
FIG. 4 is a view of an example of the configuration of a spectrophotometer.

The spectrophotometer shown in FIG. 4 comprises a light source 102 emitting light toward the CRT display panel 1 provided with the optical function film comprised of the stacked antireflection multilayer film 20, bonding layer 10, hard coat 7, and PET film 5 illustrated in FIG. 1; a slit 104 positioned in front of the light source 102, limiting the light from the light source 102 to a predetermined shape, and emitting the same to the surface of the antireflection multilayer film 20 formed at the surface of the optical function film 100; a light receiving element 106 detecting light reflected at the surface of the antireflection multilayer film 20; and a processor 108 for performing signal processing on a signal detected at the light receiving element 106 to calculate the surface reflectance of the optical function film 100.

The slit 104 makes the light emitted from the light source 102 strike the surface of the antireflection multilayer film 20 formed at the surface of the optical function film 100 at an angle θ as the light $\phi_i$. As described above with reference to FIG. 3A, when the optical function film is adhered to the surface of the CRT display panel 1, the back-reflected light is small enough to be negligible. Further, since the thickness of the CRT display panel 1 is sufficiently large, almost no light reaches the light receiving element 106.

In this state, accordingly, the light receiving element 106 receives only the surface reflected light $\phi_{RS}$ and outputs an electric signal responsive to the received amount of light.

The processor 108 can be configured by, for example, a microcomputer and calculates the surface reflectance of the optical function film 100 from the signal of the light receiving element 106. Details will be described later.

When measuring the reflectance of the optical function film 100, a wavelength λ of the light emitted from the light source 102 is changed and the reflectance at those wavelengths are successively measured. The relationship of the wavelength and the reflectance is shown by the "spectral reflectance".

Figure 5:
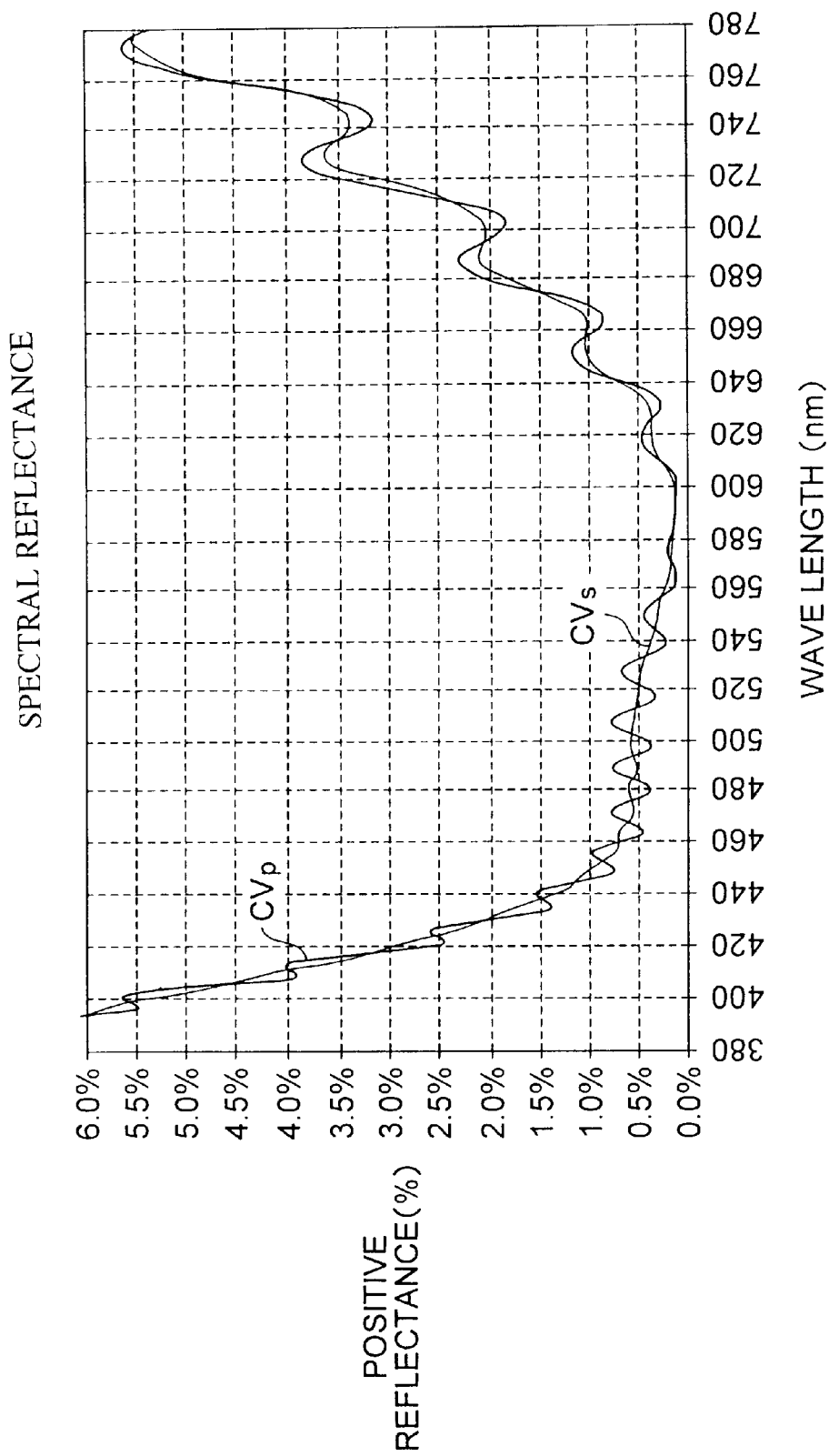
FIG. 5 is a graph of the spectral reflectance.

An example of the spectral reflectance is shown in FIG. 5. The abscissa indicates the wavelength and the ordinate indicate the positive reflectance. The curve $CV_p$ shows the positive reflectance, while the curve $CV_s$ shows the smoothed positive reflectance.

In the specification, the reflectance has a broad meaning including this spectral reflectance as well.

As explained above with reference to FIG. 3A, since the refractive indices of the PET film 5 functioning as the base film of the antireflection multilayer film 20, the bonding layer 10, and the CRT display panel 1 are very close, the amounts of light reflected at the interfaces are extremely small. Consequently, the reflections from the interfaces of the layers inside the optical function film 100 can be ignored.

In the embodiments of the present invention, however, to evaluate the performance of the optical function film in the stage of production of the optical function film, the optical function film alone is evaluated in the state shown in FIG. 3B where the optical function film is not adhered to the CRT display panel 1.

Figure 6A:
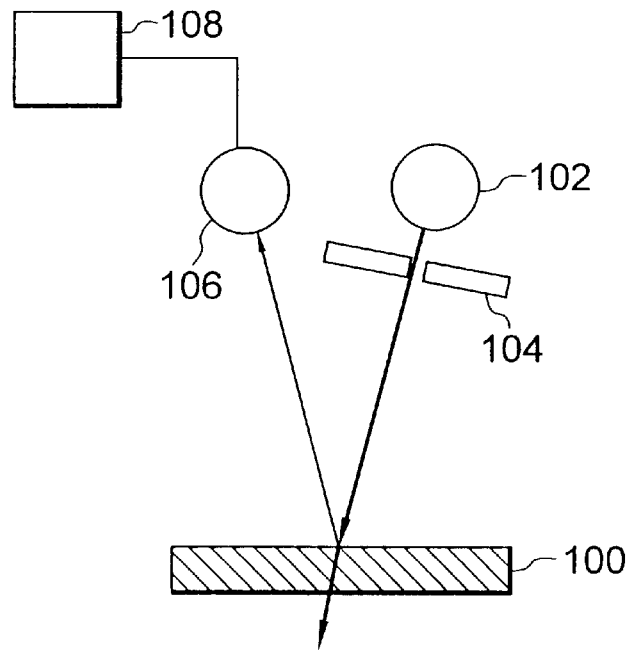
FIG. 6A is a view of an example of the configuration of an apparatus for measuring the surface reflectance of an optical function film in a state where the back of the optical function film is not painted black.

FIG. 6A is a view of the general configuration of a spectrophotometer for evaluating the optical function film alone. The spectrophotometer shown in FIG. 6A is comprised of a light source 102 for emitting light toward the optical function film 100 comprised of the stacked antireflection multilayer film 20, bonding layer 10, hard coat 7, and PET film 5; a slit 104 positioned in front of the light source 102, limiting the light from the light source 102 to a predetermined shape, and emitting the same to the surface of the optical function film 100; a light receiving element 106 detecting the light reflected from the surface of the optical function film 100; and a processor 108 for performing signal processing on the signal detected at the light receiving element 106 to calculate the surface reflectance of the optical function film 100.

The thickness of the optical function film comprised by the stacked antireflection multilayer film 20, bonding layer 10, hard coat 7, and PET film 5 is a thin one of approximately 0.2 mm. The back (inner surface) of the PET film 5 faces the ambient air which is considerably different in refractive index. Therefore, the light reflected at the interface between the back of the PET film 5 and the air is not negligible.

Therefore, in the spectrophotometer shown in FIG. 6A, when the light $\phi_i$ from the light source 102 passes through the slit 104 and strikes the surface of the optical function film 100, the back-reflected light $\phi_b$ reflected at the interface of the back of the PET film 5 of the rear portion of the optical function film 100 and the air is returned together with the surface-reflected light $\phi_{RS}$ and ends up being detected by the light receiving element 106. In this state, it is not possible to accurately measure the surface reflectance of the optical function film 100.

Figure 6B:
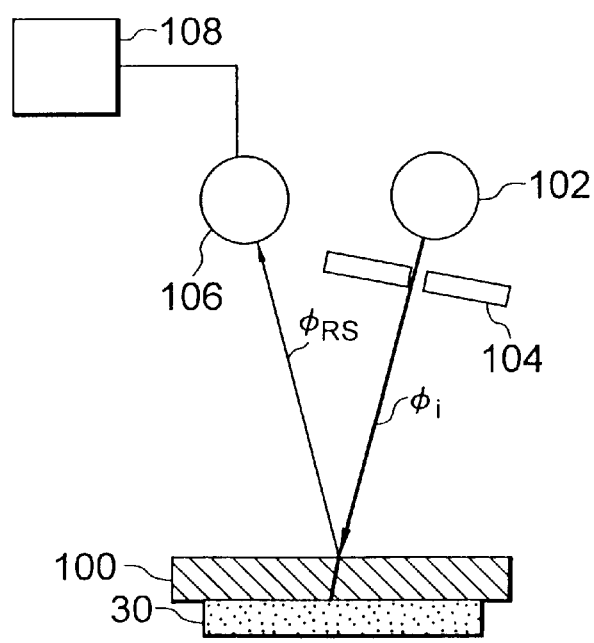
FIG. 6B is a view of an example of the configuration of an apparatus for measuring the surface reflectance of an optical function film in a state where the back of the optical function film is painted black.

As a simple method to overcome the above disadvantage, as shown in FIG. 6B, the technique had been used of measuring the surface reflectance of the optical function film 100 after applying black paint 30 to the back of the PET film 5 of the optical function film 100 to eliminate reflection from the back of the optical function film 100.

The method of measuring surface reflectance shown in FIG. 6B comprises the steps of applying black paint 30 to the back of the optical function film 100, passing light emitted from the light source 102 through the slit 104 to strike the optical function film 100, detecting only light reflected from the optical function film 100 not including the back reflection, that is, only the surface-reflected light $\phi_{RS}$, and processing the result of detection by the processor 108 to calculate the surface reflectance.

According to the above method of measuring the reflectance comprising the steps of applying black paint 30 to the back of the optical function film 100 illustrated in FIG. 6B, the it is possible to measure the surface reflectance of the optical function film 100 with an extremely high accuracy and a good reproducibility.

The method of measuring the reflectance of the optical function film 100 using a black paint described with reference to FIG. 6B, however, is a type of destructive test and suffers from a disadvantage that part of the optical function film 100 must be sampled from the production line each time, and the back of the sampled part of the optical function film 100 must be covered by the black paint 30.

Therefore, this method is not suited for measuring the reflectance in real time in the process of production of the optical function film and reflecting (feeding back) the result to the process of production of the optical function film in real time to maintain the quality of the next produced optical function film.

Accordingly, there has been a demand for a method and apparatus for measuring the surface reflectance of an optical function film in real time, at a high accuracy, and with a high reproducibility in the process of production of the optical function film without having to obtain a sample of the optical function film from the production process each time, and without having to paint the back of the samples of the optical function film black.

There has also been a demand for an apparatus for producing an optical function film having a desired surface reflectance by using the method and apparatus for measuring the surface reflectance of the optical function film.

Preferred embodiments of the present invention will now be described in detail.

Principle of Calculation of Surface Reflectance of Optical Function Film

First, the principle of measurement of the surface reflectance of an optical function film comprised of a stacked antireflection multilayer film 20, bonding layer 10, hard coat 7, and PET film 5 such as shown in FIG. 1 will be described.

The present inventors made a theoretical analysis of the light reflected from the surface of the optical function film, passing through the optical function film, and absorbed at the inside of the optical function film when light strikes the optical function film 100 shown in FIG. 3B having the antireflection multilayer film 20 shown in FIG. 2 formed at its surface. The results of the analysis will be explained below.

Figure 7:
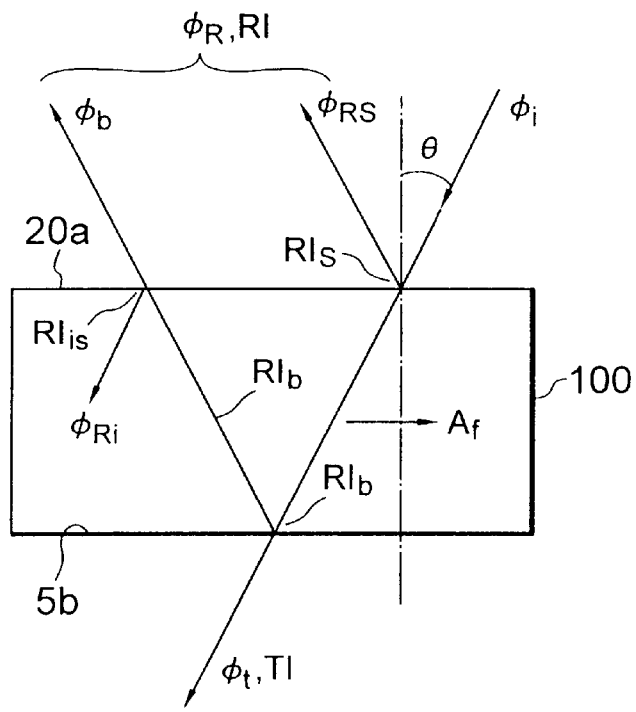
FIG. 7 is sectional view of an optical function film for explaining the path of light in an optical function film comprised of a stacked antireflection multilayer film, bonding layer, hard coat, and PET film.

FIG. 7 is a sectional view of an optical function film the same as that illustrated in FIG. 3B.

As described above, the refractive indices of the antireflection multilayer film 20, bonding layer 10, hard coat 7, and PET film 5 are very close, there the reflections from the interfaces are assumed to be negligible. Accordingly, the optical function film 100 shown in FIG. 7 is illustrated as a single film for simplification of the illustration.

The path of the light (ray tracing) will be explained with reference to FIG. 7.

When incident light $\phi_i$ strikes a surface 20a of the antireflection multilayer film 20 formed at the surface of the optical function film 100 at an incident angle θ, part of the light $\phi_i$ is reflected from the surface 20a. That reflected light is called the "surface-reflected light $\phi_{RS}$". The reflectance of the surface 20a of the antireflection multilayer film 20 is defined as $RI_s$.

The light $\phi_i (1-RI_s)$ not reflected at the surface 20a of the antireflection multilayer film 20 passes through the optical function film 100 including the antireflection multilayer film 20, bonding layer 10, hard coat 7, and PET film 5.

The absorption coefficient of the light by the antireflection multilayer film 20, bonding layer 10, hard coat 7, and PET film 5, namely, the absorption coefficient of the full optical function film 100 is defined as $A_f$. The light of $\phi_i \cdot (1-RI_s) \cdot (1-A_f)$ reaches the back portion 5b of the PET film 5 at the back of the optical function film 100.

Part of the light reaching the back 5b of the PET film 5 is reflected at the interface of the PET film 5 and the air. The remainder is output to the outside of the PET film 5. The light output to the outside of the PET film 5 is called the "transmitted light $\phi_t$".

When the reflectance at the back 5b of the PET film 5 is defined as $RI_b$, the light of $\phi_i \cdot (1-RI_s) \cdot (1-A_f) RI_b$ is reflected at the back 5b of the PET film 5 and heads back to the inside of the optical function film 100. Part of the light reflected back toward the inside of the optical function film 100 is output to the outside of the surface 20a side of the antireflection multilayer film 20, normally, the air. The light output from the inside of the optical function film, having the antireflection multilayer film 20 formed at its surface, is called the "back-reflected light $\phi_b$".

Light is reflected inside the optical function film as well. The reflectance at the inside of the optical function film (inside of antireflection multilayer film 20) is defined as $RI_{is}$.

The light reflected back at the inside of the antireflection multilayer film 20 heads toward the back 5b of the PET film 5, but that light is negligibly small.

In the specification, the sum of the surface-reflected light $\phi_{RS}$ and the back-reflected light $\phi_b$ is called the "total reflected light $\phi_R$", namely, $\phi_R = \phi_{RS} + \phi_b$.

The light transmitted out from the back 5b of the PET film 5 is called the "transmitted light $\phi_t$". The transmittance of the full optical function film 100 formed by the antireflection multilayer film 20, bonding layer 10, hard coat 7, and PET film 5 is defined as TI.

From the above analysis of the path of the light, the following relationships stand among the transmitted light $\phi_t$, the back reflectance $RI_b$, and the total reflected light $\phi_R$:

$$\phi_t = \phi_i(1-RI_s)(1-A_f)(1-RI_b) \tag{1}$$

$$\phi_b = \phi_i(1-RI_s)(1-A_f)^2 RL_b(1-RI_{is}) \tag{2}$$

$$\phi_R = \phi_{RS} + \phi_b \tag{3}$$

$$\phi_{RS} = \phi_i \times RI_s \tag{4}$$

where, $\phi_i$ is the incident light, $\phi_{RS}$ is the surface-reflected light, $\phi_b$ is the back-reflected light, $\phi_R$ is the total reflected light, $\phi_t$ is the transmitted light, $RI_s$ is the reflectance at the surface of the optical function film 100 (surface reflectance), $A_f$ is the absorption coefficient inside the optical function film 100, $RI_b$ is the back reflectance of the optical function film 100, and $RI_{is}$ is the inside reflectance of the optical function film 100.

$$TI = \frac{\phi_t}{\phi_i} = (1 - RI_S)(1 - A_f)(1 - RI_b) \quad (5)$$

The following formulas stand for the transmittance TI and the total reflectance RI of the optical function film 100:

Rewriting formula 6 utilizing the fact that the surface reflectance $RI_s$ and the inside reflectance $RI_{is}$ of the optical function film 100 are substantially equal, $$RI = \frac{\phi_R}{\phi_i} = RI_S + (1 - RI_S)(1 - A_f)^2 \cdot RI_b \cdot (1 - RI_{is}) \quad (6)$$

the following formula is obtained:

$RI_{is} \approx RI_s$ $$RI \approx RI_s + RI_b(1-RI)^2 \cdot (1-A_f)^2 \quad (7)$$

Modifying formula 5, the following formula is obtained:

$$\frac{TI}{(1 - RI_b)} = (1 - RI_b)(1 - A_f) \quad (8)$$

$$RI = RI_S + RI_b \cdot \left(\frac{T_I}{1 - RI_b}\right)^2 \quad (9)$$

The following formula is obtained from formulas 7 and 8:

Rearranging the above formulas, the following formula expressing the surface reflectance $RI_s$ of the optical function film 100 is obtained:

$$RI_s = RI - k \cdot TI^2 \quad (10)$$

where, $$k = \frac{RI_b}{(1 - RI_b)^2} \quad (11)$$

As seen from the above formulas 10 and 11, the present inventors discovered that the surface reflectance $RI_s$ of the optical function film 100 can be obtained by calculation using the three values of the total reflectance RI of the optical function film 100, the transmittance TI of the optical function film 100, and the back reflectance $RI_b$ of the optical function film 100.

Namely, they discovered that the surface reflectance $RI_s$ can be found by entering the measurable total reflectance RI and measurable transmittance TI for the optical function film 100 and the not directly measurable but newly calculatable back reflectance $RI_b$ in the formulas 10 and 11.

The methods of measurement and calculation of the total reflectance RI, transmittance TI, and back reflectance $RI_b$ will be described next.

Method of Measurement of Total Reflectance of Optical Function Film

The total reflectance RI of the optical function film 100 is measured in accordance with the method of measurement shown in FIG. 6A in the state of the optical function film 100 alone by passing light $\phi_i$ emitted from the light source 102 and limited at the slit 104 to the surface of the optical function film 100, detecting by the light receiving element 106 the total reflected light $\phi_R$ (sum of surface-reflected light $\phi_{RS}$ and back-reflected light $\phi_b$), and performing the operation of "total reflectance RI=total reflected light $\phi_R$/incident light $\phi_i$," based on formula 6 by the processor 108.

Note that the amount of the incident light $\phi_i$ is calculated in advance from the conditions of the light source 102 and the slit 104 and the incident angle $\theta$.

Method of Measurement of Transmittance of Optical Function Film

Figure 8:
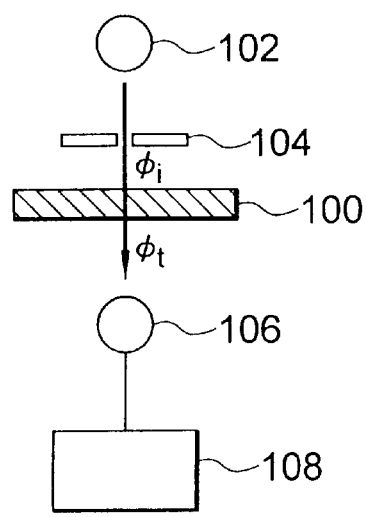
FIG. 8 is a view of the configuration of an apparatus for finding the transmittance of an optical function film comprised of a stacked antireflection multilayer film, bonding layer, hard coat, and PET film as an embodiment of the present invention.

The transmittance TI can be found by the method shown in FIG. 8.

FIG. 8 is a view of the configuration of the hardware for limiting the light from the light source 102 by the slit 104, directing the limited light $\phi_i$ to the optical function film 100 at an angle $\theta=0$, detecting the transmitted light $\phi_t$ transmitted from the back of the optical function film 100 by the light receiving element 106, and performing the operation "Transmittance TI=transmitted light $\phi_t$/incident light $\phi_i$;" based on formula 5 by the processor 108.

Figure 9:
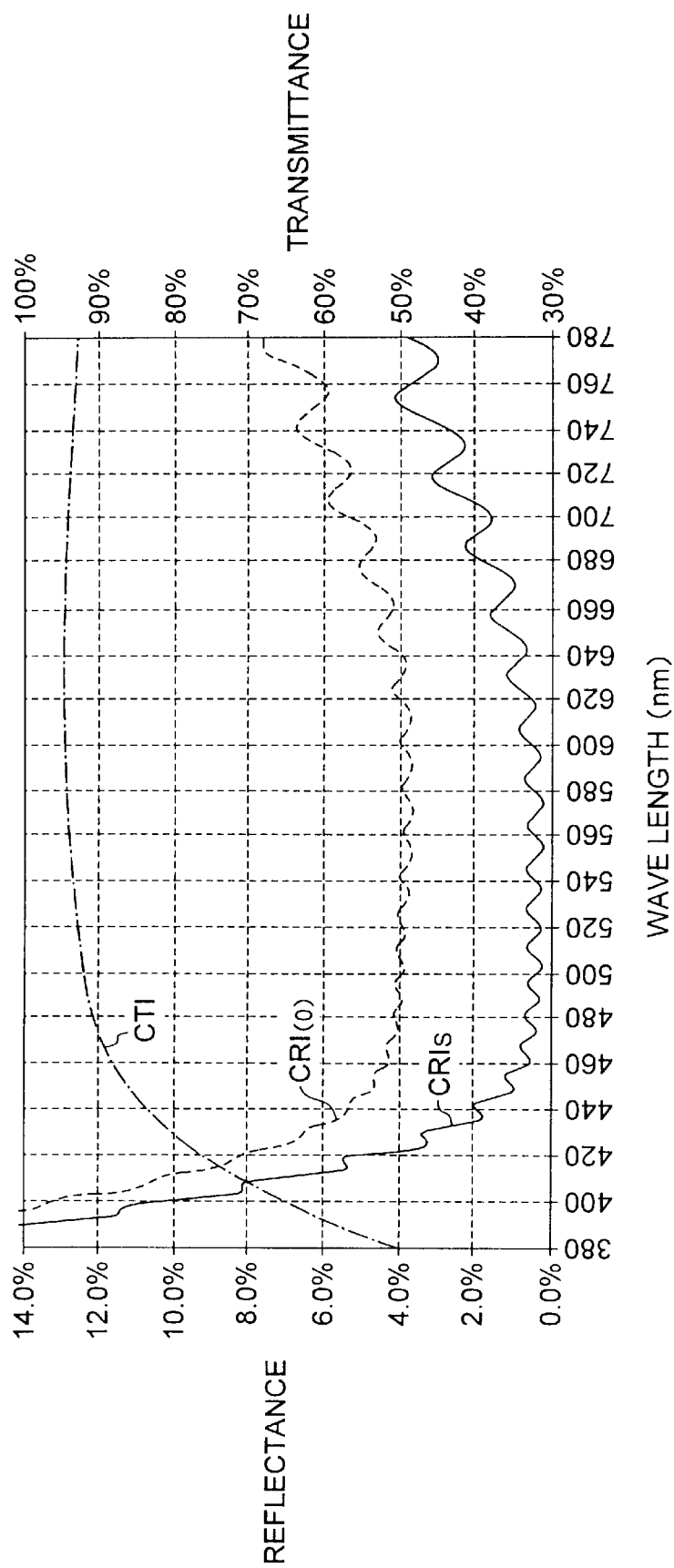
FIG. 9 is a graph of the total reflectance and transmittance measured for an optical function film whose back is not painted black and the surface reflectance of the optical function film measured after painting the back black.

FIG. 9 is a graph of the total reflectance RI and the transmittance TI of an optical function film 100 measured by the above methods and the surface reflectance $RI_s$ of the optical function film 100 measured by painting the back black.

In FIG. 9, the broken line curve $CRI_{(O)}$ shows the total reflectance $RI_{(o)}$ at the wavelength λ when not covering the back of the optical function film 100 with any black paint 30 or the like such as shown in FIG. 6A. The solid line curve $CRI_s$ shows the surface reflectance $RI_s$ at the wavelength λ when covering the back of the optical function film 100 with black paint 30 or the like such as shown in FIG. 6B. The one-dot chain line curve CTI shows the transmittance TI at the wavelength λ.

The surface reflectance $RI_s$, the total reflectance $RI_{(O)}$, and the transmittance TI of the optical function film 100 change in accordance with the wavelength λ of the light, but the surface reflectance $RI_s$ when covering the back of the optical function film 100 with black paint 30 shown by curve $CRI_s$ is lower than the total reflectance $RI_{(O)}$ when not the covering the back of the optical function film 100 with black paint 30. This is because the black paint 30 coated on the back of the optical function film 100 absorbs light and does not allow light to be reflected from the back of the optical function film 100. The surface reflectance $RI_s$ at this time may be considered to be substantially equivalent to the surface reflectance when adhering the optical function film 100 to a CRT display panel 1.

Method of Calculation of Back Reflectance of Optical Function Film

No method is known for directly measuring the back reflectance $RI_b$ of the optical function film 100. Therefore, the present inventors devised a method for calculating the back reflectance $RI_b$ by modifying the formulas 10 and 11. Details thereof will be descried below.

First, part of the optical function film is sampled from the process of production of the optical function film in advance and the sample of the optical function film is measured as follows. Note that this sampling of the optical function film is for example performed only once for a production lot of the optical function film as a representative example of the production lot and therefore differs from the method of the related art of sampling the optical function film being measured for each measurement of the surface reflectance. Accordingly, the embodiment can reduce the number of samplings of the optical function film and therefore does not interfere with the production of the optical function film.

(1) The total reflectance RI of the optical function film standing alone is measured by the method shown in FIG. 6A.

(2) The transmittance TI of the optical function film standing alone is measured by the method shown in FIG. 8.

(3) The surface reflectance $RI_s$ of the optical function film with a back painted black is measured by the method shown in FIG. 6B.

The surface reflectance $RI_s(\lambda)$ of light of a wavelength $\lambda$ can be expressed as shown in the formulas 10 and 11 using the total reflectance $RI(\lambda)$ at the wavelength $\lambda$, the transmittance TI at the wavelength $\lambda$, and the back reflectance $RI_b(\lambda)$ at the wavelength $\lambda$. Then, by solving the formulas 10 and 11 for the back reflectance $RI_b(\lambda)$, the back reflectance $RI_b(\lambda)$ can be obtained.

Solving formula 10 for the coefficient $\underline{k}$ gives the following formula 12:

$$k = \frac{RI - RI_S}{(TI)^2} \tag{12}$$

By entering the surface reflectance $RI_s(\lambda)$, total reflectance $RI(\lambda)$, and transmittance $TI(\lambda)$ measured by the above methods for the optical function film sampled from the production process into formula 12, the coefficient $\underline{k}$ can be found. Namely, the coefficient $\underline{k}$ is calculated for a representative optical function film such as the optical function film sampled above.

Since the coefficient $\underline{k}$ is found, formula 11 may be developed to give the following formula 13:

$$k \cdot RI_b^2 - (2k+1) \cdot RI_b \cdot k = 0 \tag{13}$$

Solving formula 13 for the back reflectance $RI_b(\lambda)$, the following formula 14 is obtained:

$$RI_b = \frac{1}{2k}\left[(2k+1) - \sqrt{(2k+1)^2 - 4k^2}\right] \tag{14}$$

Figure 10:
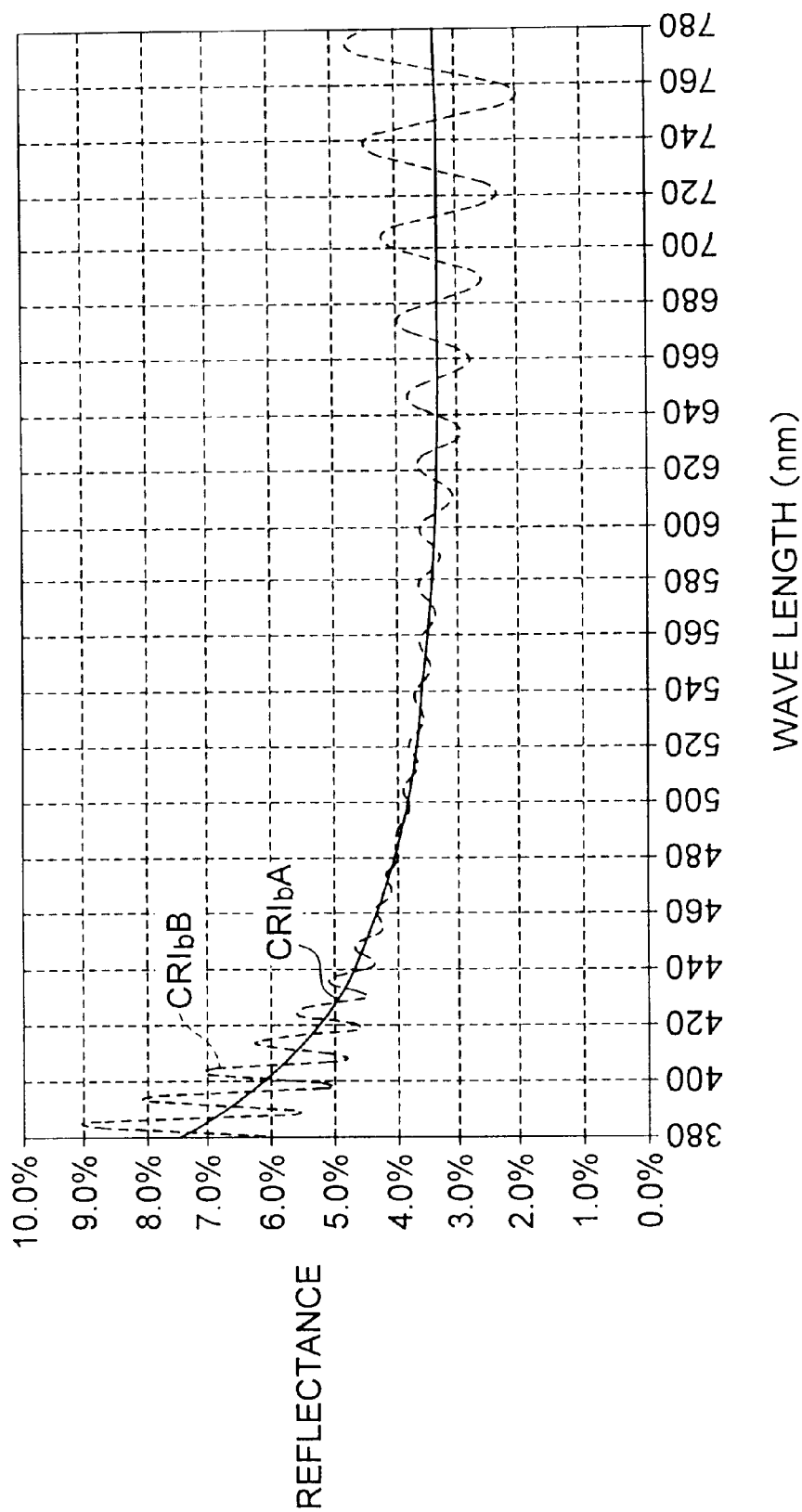
FIG. 10 is a graph of an example of finding the back reflectance of an optical function film from values of the total reflectance, transmittance, and surface reflectance of the optical function film shown in FIG. 7.

FIG. 10 is a graph of an example of finding the back reflectance $RI_b$ from the values of the three characteristics of the total reflectance RI, transmittance TI, and surface reflectance $RI_s$ of the optical function film using formula 14.

The broken line curve $CRI_bB$ is the raw back reflectance obtained by the calculation of formula 14, while the solid line curve $CRI_bA$ is the smoothed back reflectance obtained by a regression operation on the raw back reflectance.

The raw back reflectance and the smoothed back reflectance will be described next.

In the optical function film 100, the hard coat 7 is provided between the antireflection multilayer film 20 and the PET film 5 serving as the base film for the antireflection multilayer film 20, so as shown by the curve $CRI_bB$ in FIG. 10, the interference wave of the hard coat 7 is superposed on the back reflection $RI_b$. Namely, the spectra of the total reflectance RI, surface reflectance $RI_s$, and transmittance TI of the optical function film 100 at the wavelength $\lambda$ include the spectrum of the interference wave of the hard coat 7. As a result, the spectrum of the interference wave of the hard coat 7 is superposed on the spectrum of the back reflectance $RI_b$ of the optical function film calculated from the slight deviation of the interference wave at the time of measurement of the spectra. The interference wave has a long period and cannot be eliminated by normal smoothing.

The present inventors therefore decided to utilize the fact that the reflectance of a substance is defined by the refractive index of that substance, use an experimental equation showing the relation between the refractive index and the wavelength to perform a regression calculation between the back reflectance $RI_b$ on which the interference wave is superposed and the wavelength, and find the accurate back reflectance $RI_b$ of the optical function film not affected by an interference wave due to the hard coat 7 from the regression polynomial found.

An example of the experimental formula for the regression operation used in this embodiment is shown below:

$$\frac{1}{RI_b(\lambda)^x} = A + \frac{B}{\lambda} + \frac{C}{\lambda^2} \tag{15}$$

where, $\lambda$ is the wavelength of the incident light, x is a coefficient of ½ to ⅓, and A to C are variables found by the regression calculation.

The coefficient x normally has a value of ½ to ⅓ and can be modified in accordance with the state of convergence of curve fitting in the numerical calculation therefor.

This operation is carried out in the processor 108.

Figure 11:
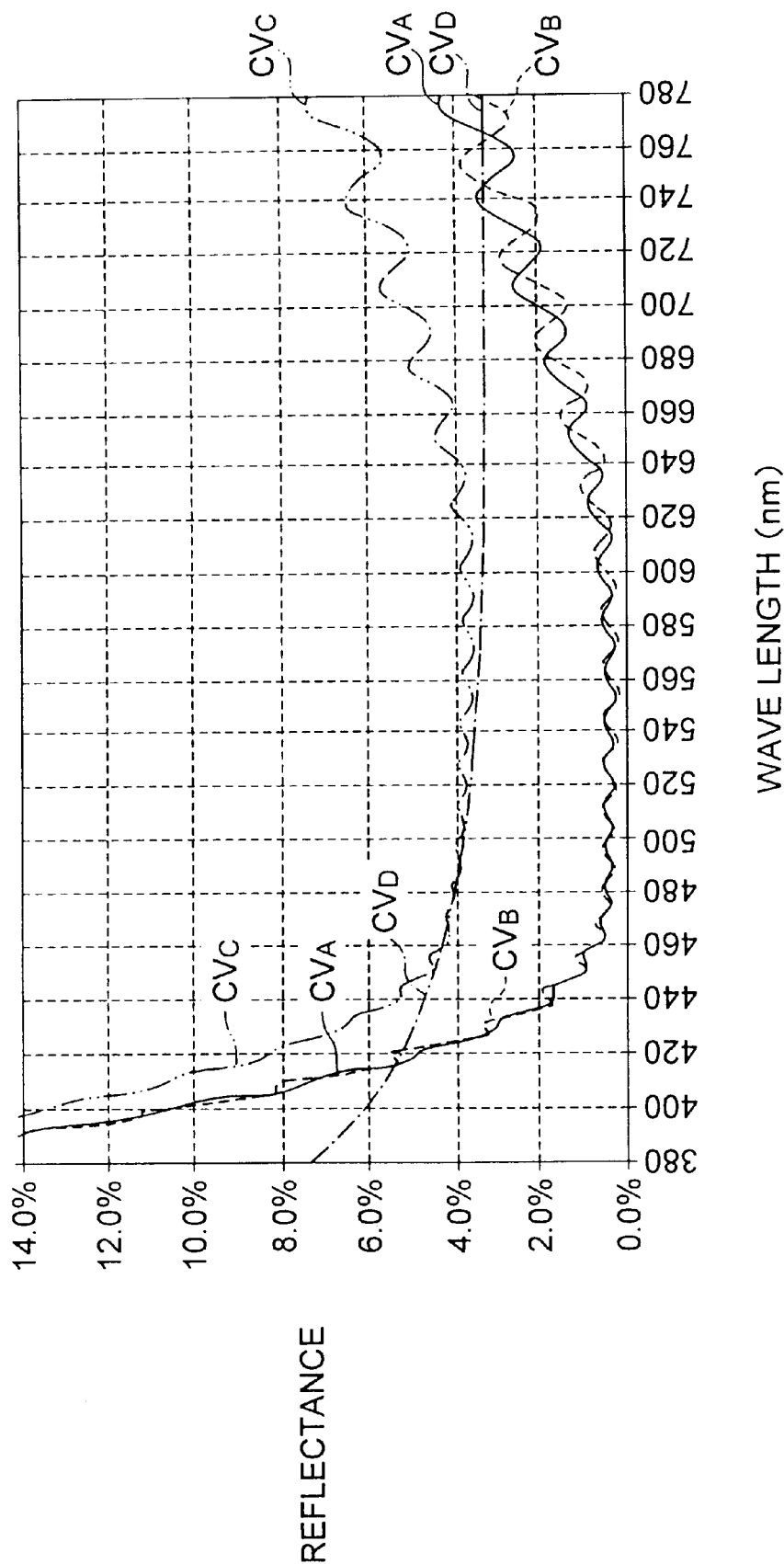
FIG. 11 is a graph showing a the back reflectance of an optical function film obtained from values of the total reflectance, transmittance, and surface reflectance of an optical function film, a surface reflectance calculated by using the obtained back reflectance, and another surface reflectance measured when the back of the optical function film is painted black.

An example of the back reflectance $RI_b$ of the optical function film corrected by the above method is shown by the solid line curve $CRI_bA$ in FIG. 10 and the curve $CV_D$ in FIG. 11. At this time, x=0.5, A=1.87362, B=1652.37, and C=−554593.

FIG. 11 is a graph showing the results of a study of the accuracy of the real time measurement comparing the surface reflectance $RI_s$ of an optical function film with a back not painted black and the surface reflectance $RI_s$ of an optical function film with a back painted black—both measured and calculated in real time in this way.

In FIG. 11, curve $CV_A$ shows the surface reflectance of an optical function film obtained from the back reflectance, curve $CV_B$ shows the surface reflectance of the optical function film with a back painted black, curve $CV_C$ shows the total reflectance of the optical function film without a back painted black, and curve $CV_D$ shows the regression corrected back reflectance $RI_b$.

Calculation of Surface Reflectance of Optical Function Film

The back reflectance $RI_b$ calculated in this way for the optical function film sampled from the production process normally is constant in so far as the characteristics of the PET film 5 serving as the base film of the antireflection multilayer film 20 do not change, so it is possible to use the back reflectance $RI_b$ found for the optical function film sampled from the production process in a sampling test of a production lot for measurement of the reflectance of other optical function films in the same production lot. Accordingly, the back reflectance $RI_b$ obtained for every production lot is stored in the processor 108 and the stored back reflectance $RI_b$ is read out and entered into formula 11 to calculate the coefficient k when measuring the reflectance of the optical function film in that production lot in real time in the production process.

Figure 12:
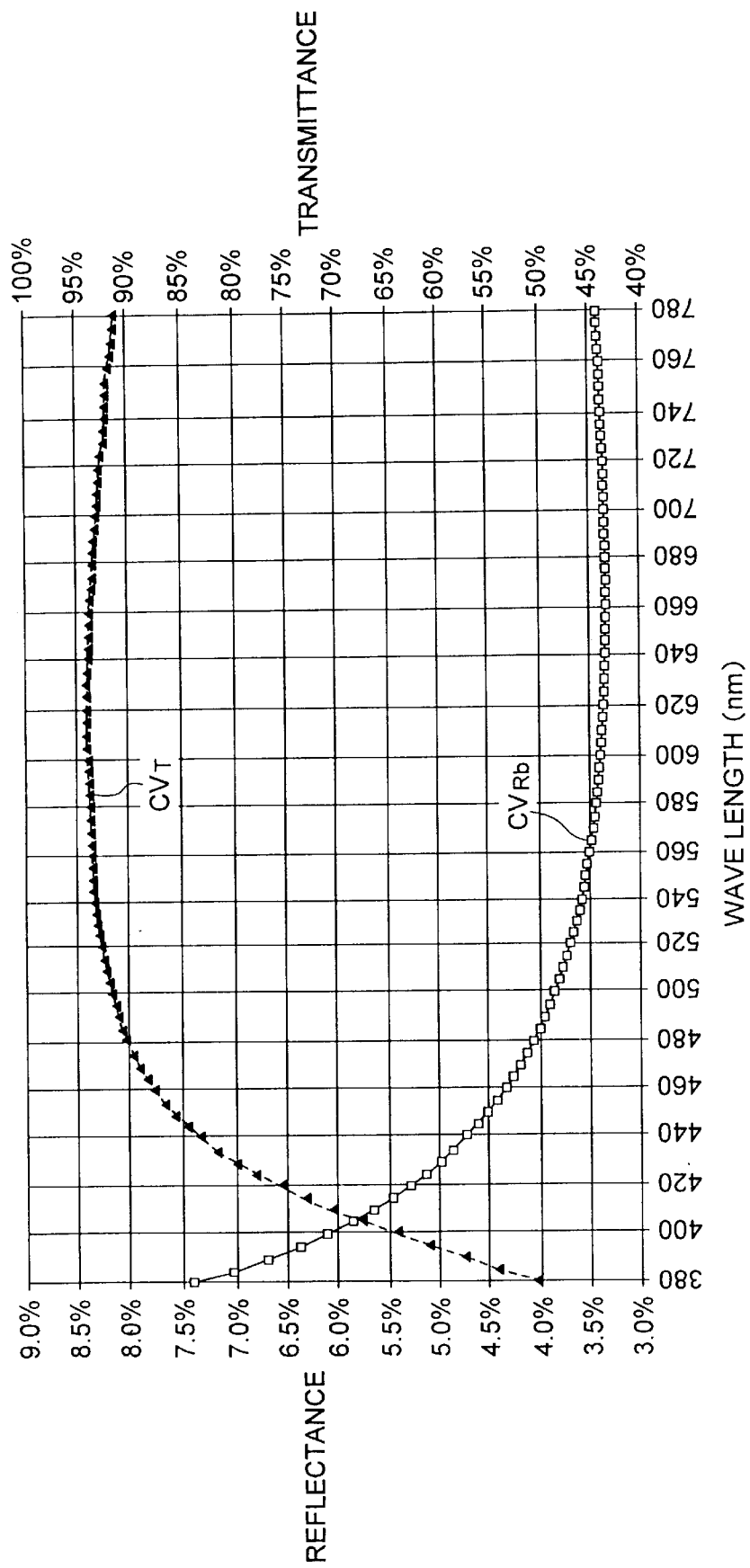
FIG. 12 is a graph of the results of the back reflectance and transmittance found for the examples shown in FIG. 10 and FIG. 11.

FIG. 12 is a graph of the back reflectance and the transmittance of the optical function film corrected by the regression calculation in the example shown in FIGS. 10 and 11. Curve $CV_{Rb}$ shows the back reflectance, and $CV_T$ shows the transmittance. The values of the back reflectance and the transmittance for every wavelength are stored in the processor 108.

The processor 108 can interpolate the back reflectance and the transmittance for wavelengths not stored in processor 108. For example, when a back reflectance and transmittance at 410 nm between the stored values of adjoining wavelengths 400 nm and 420 nm are required, it performs linear interpolation to calculate the back reflectance and transmittance at 410 nm.

When these conditions have been met, the processor 108 calculates the surface reflectance $RI_s$ by entering the coefficient k, total reflectance RI, and transmittance TI into formula 10.

The above were the fundamentals of the method of calculation of the surface reflectance $RI_s$ of the optical function film 100 of the present embodiment.

As explained above, according to the above embodiment, the surface reflectance $RI_s$ of the optical function film can be measured without applying black paint on the back (lower portion) of the optical function film.

The method of calculation of the surface reflectance $RI_s$ of the optical function film according to the present embodiment does not change the amount of correction for calculating the back reflectance $RI_b$ or use a conversion formula as in the above method of the related art, so can accurately find the surface reflectance $RI_s$ of the optical function film.

According to the present embodiment, further, it is also possible to find the surface reflectance $RI_s$ of the optical function film in the production process by a simple method.

Further, according to the present embodiment, it is possible to calculate the surface reflectance $RI_s$ of the optical function film in the production process continuously in real time. Accordingly, the calculated surface reflectance can be fed back to the production process to obtain an optical function film of a high quality. For example, when the calculated surface reflectance $RI_s$ is evaluated by the processor 108 etc. and it is found that the surface reflectance is starting to exceed the allowable limits or is already out of the allowable limits, the processor 108 feeds this information back to the production process to correct the operational conditions therein. This contributes the improvement of quality and yield of the optical function film.

Second Embodiment

Next, an explanation will be given of a method and apparatus for measuring the surface reflectance of a light-transmitting type antireflection optical function film (optical function film) of the above embodiment in the actual production process and a method of production of an optical function film using that method and apparatus.

Figure 13:
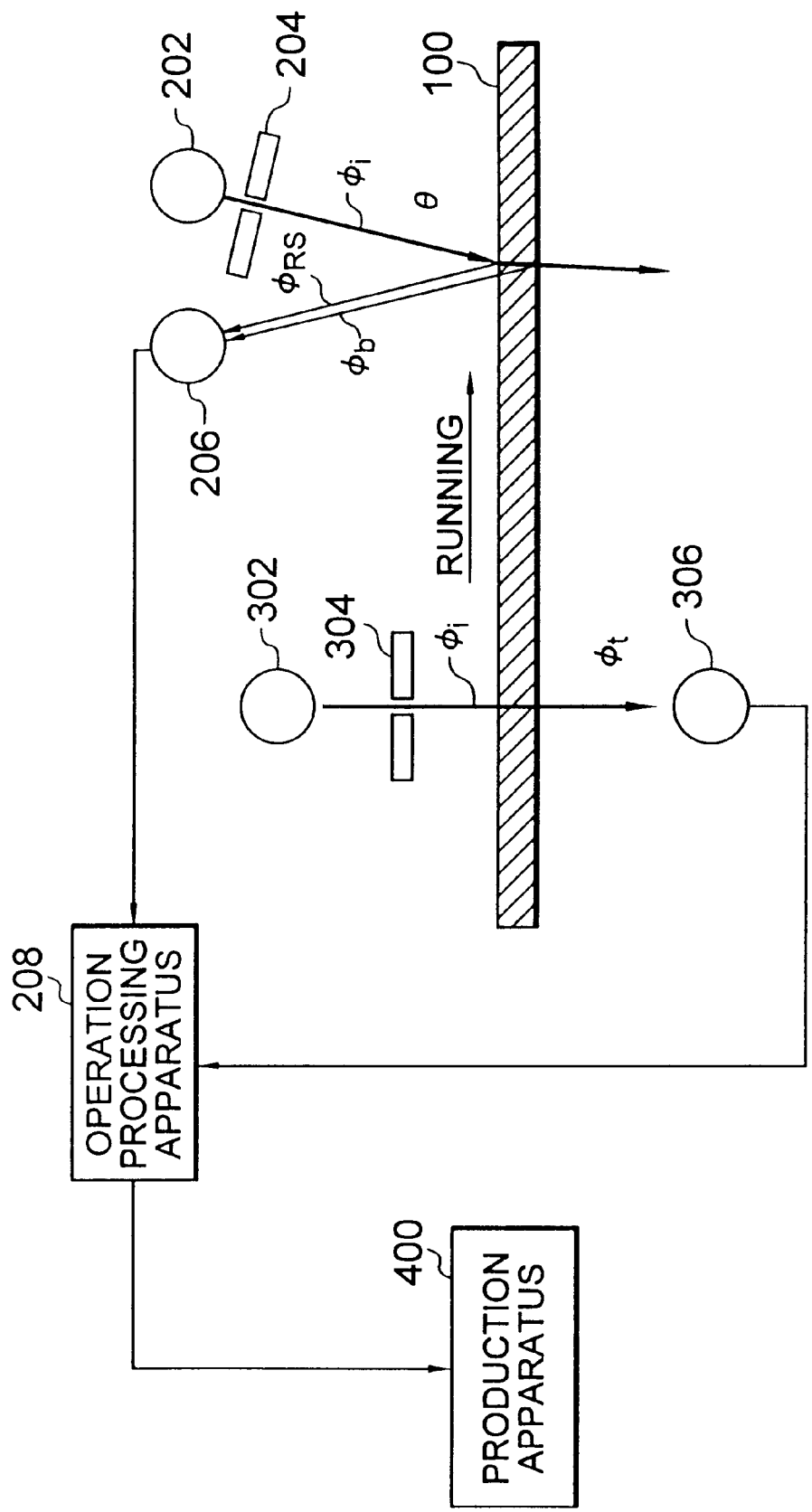
FIG. 13 is a view of the configuration of an apparatus for measuring in real time a surface reflectance of an optical function film in a process for producing an optical function film comprised of a stacked antireflection multilayer film, bonding layer, hard coat, and PET film as a second embodiment of the present invention.

FIG. 13 is a view of the configuration of an apparatus for measuring in real time the surface reflectance $RI_s$ of an optical function film 100 comprised of a stacked antireflection multilayer film 20, bonding layer 10, hard coat 7, and PET film 5 shown in FIG. 3B in a process of production of the optical function film 100.

The optical function film 100 generally is produced as a long continuous film, for example, a film having a length of 1000 meters.

In the second embodiment, the total reflectance RI and the transmittance TI of the optical function film 100 are measured in real time in the state with such an optical function film 100 running.

In FIG. 13, the optical function film 100 is continuously output as a long object from a production apparatus 400.

The apparatus for measuring the surface reflectance of the optical function film 100 shown in FIG. 13 is comprised of a portion for measuring the total reflectance RI and a portion for measuring the transmittance TI.

The portion for measuring the total reflectance RI of the optical function film 100 comprises a first light source 202, a first slit 204, a first light receiving element 206, and a processor 208. The first light source 202, first slit 20, first light receiving element 206, and processor 208 are basically same as the light source 102, slit 104, light receiving element 106, and processor 108 of the apparatus shown in FIG. 6A.

The portion for measuring the transmittance TI of the optical function film 100 comprises a second light source 302, a second slit 304, a second light receiving element 306, and the processor 208. The portion for measuring the transmittance TI of the optical function film is substantially the same as the portion for measuring the transmittance TI of the optical function film 100 explained with reference to FIG. 8.

The same processor 208 is used for calculating the total reflectance RI and the transmittance TI of the optical function film 100.

The measurement of the total reflectance RI of the optical function film 100 will be described next.

Light from the first light source 202 is passed through the slit 204 and strikes the surface of the running optical function film 100 as the incident light $\phi_i$ at an incident angle θ. The sum of the surface reflected light $\phi_{RS}$ from that surface and the back reflected light $\phi_b$ from the back of the optical function film 100, that is, the total reflected light $\phi_R$, is detected at the first light receiving element 206. The processor 208 calculates the total reflectance RI from the ratio of the incident light $\phi_i$ and total reflected light $\phi_R$ based on formula 6.

Note that, as disclosed in Japanese Patent Application No. 10-6999, the surface reflectance $RI_s$ of the antireflection multilayer film 20 positioned at the surface of the optical function film 100 differs depending on the incident angle θ of the incident light $\phi_i$ and the wavelength λ of the incident light $\phi_i$ as well. Therefore, when measuring the surface reflectance $RI_s$ of the optical function film 100, it is preferable to change the wavelength λ and the incident angle θ of the Incident light $\phi_i$ in various ways.

The method of measurement of the transmittance TI of the optical function film 100 will be described next.

Light from the second light source 302 is passed through the second slit 304 and strikes the surface of the running optical function film 100 as the incident light $\phi_i$ at an angle θ. The transmitted light $100_t$ transmitted through the optical function film 100 is detected at the second light receiving element 306. The processor 208 calculates the transmittance TI of the optical function film 100 as a ratio of the incident light $\phi_i$ and transmitted light $\phi_t$ based on formula 5.

The back reflectance $RI_b$ of the optical function film 100 is determined by the reflection characteristic of the PET film 5 shown in FIG. 1, but as explained above, this value is relatively stable. Therefore, it is possible to use the back reflectance $RI_b$ measured in advance in a sampling inspection of each lot for the measurement of the surface reflectance of the optical function film of that lot.

After having taken advanced preparations in this way, along with the running of the optical function film being continuously produced, at predetermined periods, for example, every minute, or at predetermined running distances, for example, every meter, the portion for measuring the total reflectance RI and the portion for measuring the transmittance TI shown in FIG. 13 measure the total reflectance RI and the transmittance TI of the optical function film 100 (the processor 208 calculates the total reflectance RI and the transmittance TI) and the processor 208 calculates the surface reflectance $RI_s$ using the previously measured back reflectance $RI_s$ in accordance with formula 10.

As described above, FIG. 11 shows the results of a study of the accuracy of the real time measurement comparing the surface reflectance $RI_s$ of an optical function film with a back not painted black and the surface reflectance $RI_s$ of an optical function film with a back painted black—both measured and calculated in real time in this way. Curve $CV_A$ shows the surface reflectance of the optical function film obtained from the back reflectance, curve $CV_B$ shows the surface reflectance of the optical function film with the back painted black, curve $CV_C$ shows the total reflectance of the optical function film without the back painted black, and curve $CV_D$ shows the regression corrected back reflectance $RI_b$.

FIG. 11 shows that the surface reflectance $RI_s$ can be obtained accurately even by the method of this embodiment where the back of the optical function film 100 is not painted black.

The processor 208 feeds back the surface reflectance $RI_s$ of the optical function film 100 obtained by the above method to the production apparatus 400 of the optical function film to correct the production conditions of the optical function film 100, for example, the production conditions of the antireflection multilayer film 20 formed at the surface of the optical function film 100.

As disclosed in Japanese Patent Application No. 10-6999, the thicknesses of the layers of the optical function film 100 can be adjusted so as to give a spectral reflectance of not more than 1% when the incident light $\phi_i$ having a wavelength of 490 to 640 nm strikes the optical function film 100 at an angle 10°0. Alternatively, the thicknesses of the layers of the optical function film 100 can be adjusted to give spectral reflectance characteristics of the long wavelength side for an incident angle 10° of, for example, a reflectance of not more than 1% when the wavelength of the incident light $\phi_i$ is 650 nm, a reflectance of not more than 1.6% when the wavelength of the incident light $\phi_i$ is 700 nm, and a reflectance of not more than 2.7% when the wavelength of the incident light $\phi_i$ is 750 nm. Alternatively, the thicknesses of the layers of the optical function film 100 can be adjusted to give spectral reflectance characteristics giving a y-value of the chromaticity of the reflected light between 0.10 and 0.25 when incident light $\phi_i$ having a wavelength of 380 nm to 780 nm strikes the optical function film 100 at an angle $\theta=10°$. Details of the relationship between the thicknesses of the layers and the light are given in Japanese Patent Application No. 10-6999.

In this way, the production apparatus 400 controls the conditions to give the above thicknesses of the layers of the optical function film 100. As a result, it is possible to produce an optical function film 100 having the desired surface reflectance $RI_s$.

Note that when the value of the transmittance TI of the optical function film 100 is stable, it is not necessary to measure the transmittance TI at predetermined periods such as described above. The transmittance TI may be measured in advance during the sampling inspection of the lot in the same way as with the back reflectance $RI_b$ and the result used for calculating the surface reflectance $RI_s$. In this case, while the portion for measuring the total reflectance R1 shown in FIG. 13 remains, the portion for measuring the transmittance TI becomes unnecessary and therefore the configuration of the apparatus becomes simpler.

Experimental Examples

The yield of the optical function film in the related art was approximately 10%.

The yield of the optical function film in the present embodiment was improved to approximately 90%. This improvement of the yield was achieved by feeding back the measured surface reflectance $RI_s$ of the optical function film to the production process (apparatus).

While the invention has been described with reference to specific embodiments chosen for purpose of illustration, it should be apparent that numerous modifications could be made thereto by those skilled in the art without departing from the basic concept and scope of the invention.

For example, in the above description, the explanation was made using a display panel of a CRT display device as a representative example of a display panel on which the optical function film is adhered in the present invention and using the antireflection multilayer film disclosed in Japanese Patent Application No. 10-6999 as a representative example of the antireflection multilayer film 20 at the surface of the optical function film, but of course the method and apparatus for measuring the surface reflectance of an optical function film of the present invention is not limited to a CRT display device or such an antireflection multilayer film and can be applied to other display panels, such as plasma display panels, electroluminescence panels, and the liquid crystal display panels and other antireflection multilayer films.

Summarizing the effects of the invention, accordingly to the present invention, the surface reflectance of an optical function film can be accurately measured without having to paint the back of the optical function film black, in other words, without having to destroy the optical function film.

Further, according to the present invention, the surface reflectance of the optical function film can be found in real time, fast and automatically, in the process for production of the optical function film. As a result, according to the present invention, it is possible to feed back the found surface reflectance to the process of production of the optical function film and thereby maintain and further improve the yield and quality of the continuously produced optical function film.

The apparatus for measuring the surface reflectance of the optical function film has a simple structure and can be constructed easily and at a low cost.

What is claimed is:

1. A method of measuring a surface reflectance of a light-transmitting type antireflection optical function film comprising a step of calculating the surface reflectance of the optical function film from a back reflectance, total reflectance, and transmittance of the optical function film.

2. A method of measuring a surface reflectance as set forth in claim 1 wherein the surface reflectance of the optical function film is defined by the following formula:

$$RI_s=RI-(TI)^2\times[RI_b/(1-RI_b)^2]$$

where, $RI_s$ is the surface reflectance of the optical function film,

RI is the total reflectance of the optical function film,

TI is the transmittance of the optical function film, and $RI_b$ is the back reflectance of the optical function film.

3. A method of measuring a surface reflectance as set forth in claim 2, further comprising:

calculating the back reflectance of a representative film in advance;

measuring the actual total reflectance and transmittance of the optical function film being measured in real time; and entering the back reflectance and the total reflectance and transmittance calculated for the optical function film to be measured into the above formula to calculate the surface reflectance.

4. A method of measuring a surface reflectance as set forth in claim 3, wherein said back reflectance $RI_b$ is calculated from a surface reflectance $RI_s$, total reflectance RI, and transmittance measured by sampling in advance for a representative film by entering these measured values into the formula for finding the measured surface reflectance $RI_s$ and by performing a regression operation using polynomials between the back reflectance $RI_b$ for each wavelength found here and a wavelength of the light entering the optical function film for smoothing.

5. A method of measuring a surface reflectance as set forth in claim 3, wherein said total reflectance RI is calculated by detecting the light reflected from the surface and back of the optical function film when incident light $\phi_i$ having a predetermined wavelength enters the optical function film to detect the total reflected light $\phi_R$ and performing the operation $RI=\phi_R/\phi_i$.

6. A method of measuring a surface reflectance as set forth in claim 3, wherein said transmittance TI is calculated by detecting the light $\phi_t$ transmitted through the optical function film when the incident light $\phi_i$ having a predetermined wavelength enters the optical function film in a perpendicular direction and performing the operation $TI=\phi_t/\phi_i$.

7. A method of measuring a surface reflectance as set forth in claim 3, wherein said transmittance is found in advance by sampling for the representative film and that value is used for calculating the surface reflectance.

8. A method of measuring a surface reflectance as set forth in claim 1, wherein the optical function film comprises an antireflection multilayer film, bonding layer, hard coat, and PET film having similar refractive indices stacked over each other.

9. A method of producing a light-transmitting type antireflection optical function film including the steps of:

sampling a representative film for a film continuously produced from an apparatus for continuously producing the optical function film and measuring in advance a back reflectance for the sampled film;

measuring in real time a transmittance and total reflectance of the continuously produced film being measured;

calculating in real time a surface reflectance of the optical function film using the transmittance and total reflectance and the previously calculated back reflectance; and feeding back the calculated surface reflectance to the production in the process of production of the optical function film to thereby produce a film having a desired surface reflectance.

10. A method of producing a light-transmitting type antireflection optical function film as set forth in claim 9, wherein the surface reflectance of the optical function film is defined by the following formula:

$$RI_s=RI-(TI)^2\times[RI_b/(1-RI_b)^2]$$

where, $RI_s$ is the surface reflectance of the optical function film,

RI is the total reflectance of the optical function film,

TI is the transmittance of the optical function film, and $RI_b$ is the back reflectance of the optical function film.

11. A method of producing a light-transmitting type antireflection optical function film as set forth in claim 9, wherein the optical function film comprises an antireflection multilayer film, bonding layer, hard coat, and PET film having similar refractive indices stacked over each other.

12. An apparatus for measuring in real time a surface reflectance of a light-transmitting type antireflection optical function film being continuously produced from an apparatus for continuously producing the optical function film, comprising:

a total reflectance calculation apparatus including a first light source means for emitting a first light having a first wavelength to the optical function film at a predetermined angle, a first light receiving means for detecting the light reflected from the surface and back of the optical function film, and a total reflectance calculating means for calculating a ratio of the first light and the detected reflected light to calculate the total reflectance;

a transmittance calculation apparatus including a second light source means for emitting a second light having a second wavelength to the optical function film at a right angle, a second light receiving means for detecting the light passed through the optical function film, and a transmittance calculating means for calculating a ratio of the second light and the detected passing light to calculate the transmittance;

a back reflectance calculating means for calculating in advance a back reflectance of a representative film; and a surface reflectance processing means for calculating for an optical function film being measured the surface reflectance of the optical function film from the total reflectance calculated at the total reflectance calculation apparatus, the transmittance calculated at the transmittance calculation apparatus, and the back reflectance calculated at the back reflectance calculating means.

13. An apparatus for measuring a surface reflectance as set forth in claim 12, wherein the surface reflectance processing means computes the surface reflectance of the optical function film based on the following formula:

$$RI_s=RI-(TI)^2\times[RI_b/(1-RI_b)^2]$$

where, $RI_s$ is the surface reflectance of the optical function film,

RI is the total reflectance of the optical function film,

TI is the transmittance of the optical function film, and $RI_b$ is the back reflectance of the optical function film.

14. An apparatus for measuring a surface reflectance as set forth in claim 13, wherein the total reflectance calculating means in the total reflectance calculation apparatus, the transmittance calculating means in the transmittance calculation apparatus, and the surface reflectance calculating means are formed by a single processing means.

15. An apparatus for measuring a surface reflectance as set forth in claim 12, wherein the optical function film comprises an antireflection multilayer film, bonding layer, hard coat, and PET film having similar refractive indices stacked over each other.

* * * * *